Patented May 16, 1933

1,908,918

UNITED STATES PATENT OFFICE

GUSTAV REDDELIEN, OF LEIPZIG, AND HANS LANGE, OF DESSAU IN ANHALT, GERMANY, ASSIGNORS TO WINTHROP CHEMICAL COMPANY, INC., OF NEW YORK, N. Y., A CORPORATION OF NEW YORK

MANUFACTURING 1.2.3.4-TETRAHYDRO-6-NAPHTHALDEHYDE

No Drawing. Application filed July 15, 1930, Serial No. 468,205, and in Germany July 29, 1929.

Our present invention relates to a process of manufacturing 1.2.3.4-tetrahydro-6-naphthaldehyde of the formula

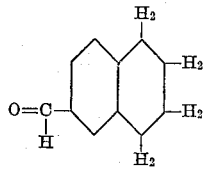

and is based on the observation that this aldehyde is obtainable by subjecting 6-chloromethyl-1.2.3.4-tetrahydronaphthalene of the formula

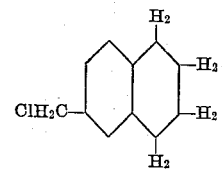

to a suitable oxidation process.

Oxidizing chemicals converting a chloromethyl group bound to an aromatic radical into the aldehyde group are well known in the art and we enumerate, for instance, as such oxidizing agents an alkaline chromate solution or aqueous solutions of copper nitrate, lead nitrate and so on. It was to be expected that oxidizing agents at first would attack the hydrogenated nucleus, in fact, however, a smooth formation of the tetrahydronapthaldehyde takes place without alteration of the hydrogenized part of the molecule.

The 1.2.3.4-tetrahydro-6-naphthaldehyde is well known and described, for instance, in Berichte der Deutschen Chemischen Gesellschaft, vol. 55, pages 1708-09.

The 6-chloromethyl-1.2.3.4-tetrahydronaphthalene used as starting material is obtainable by acting with formaldehyde in the presence of concentrated hydrochloric acid upon 1.2.3.4-tetrahydronaphthalene.

The aldehyde obtained having an odor similar to cherry wood may be used in the manufacture of perfumes or as an intermediate product in the manufacture of other valuable compounds.

The following example serves to illustrate our invention without limiting it, the parts being by weight:

*Example.*—540 parts of 6-chloromethyl-1.2.3.4-tetrahydronaphthalene are boiled for 20 hours under reflux while stirring with 300 parts of sodium bichromate and 40 parts of caustic soda dissolved in 1500 parts of water. The ar.-tetrahydronaphthalene-$\beta$-aldehyde may be separated either by distillation with steam with which it passes over only slowly or by extraction with ether or benzene. In order to purify it, its bisulfite compound may be formed, from which the aldehyde is obtainable with a very good yield and in a pure state by decomposition with soda. The aldehyde boils at 142 to 143° C. under 11 mm. pressure of mercury and may be identified by its semi-carbazone melting at 222 to 223° C.

What we claim is:

1. The process which comprises acting upon 6-chloromethyl-1.2.3.4-tetrahydronaphthalene with an oxidizing agent of the group consisting of an alkaline chromate solution, lead nitrate and copper nitrate.

2. The process which comprises boiling about 540 parts of 6-chloromethyl-1.2.3.4-tetrahydronaphthalene with about 500 parts of sodium bichromate and about 20 parts of caustic soda dissolved in about 1500 parts of water under reflux for about 20 hours.

In testimony whereof, we affix our signatures.

GUSTAV REDDELIEN.
HANS LANGE.